United States Patent [19]

Fouilleux et al.

[11] Patent Number: 5,219,047
[45] Date of Patent: Jun. 15, 1993

[54] DISC BRAKE CALIPER ASSEMBLY

[75] Inventors: Bernard Fouilleux, Champigny sur Marne; Eric Schonenberger, Bois Colombes; Gabriel Gregoire, Luzarches, all of France; Ralph A. Gordon, Centerville; Victor A. Ferguson, Kettering, both of Ohio

[73] Assignees: General Motors Corp., Detroit, Mich.; General Motors France, Gennevilliers, France

[21] Appl. No.: 826,708

[22] Filed: Jan. 28, 1992

Related U.S. Application Data

[62] Division of Ser. No. 489,052, Mar. 7, 1990, Pat. No. 5,086,884.

[30] Foreign Application Priority Data

Apr. 25, 1989 [GB] United Kingdom ............... 8909442

[51] Int. Cl.$^5$ ............................................ F16D 65/56
[52] U.S. Cl. ................................. 188/71.9; 188/72.6; 188/72.8; 188/72.9; 188/106 F; 188/196 D
[58] Field of Search .................. 188/71.9, 72.6, 72.7, 188/72.8, 72.9, 106 F, 196 D; 192/70.25

[56] References Cited

U.S. PATENT DOCUMENTS

| 3,322,235 | 5/1967 | Forbush | 188/71.9 |
|---|---|---|---|
| 3,331,472 | 7/1967 | Swift | 188/71.9 |
| 3,488,687 | 1/1970 | Farr | 188/71.9 X |
| 3,653,470 | 4/1972 | Travis | 188/71.9 |
| 3,688,875 | 9/1972 | DeHoff et al. | 192/111 A X |
| 3,767,016 | 10/1973 | Hurt | 188/196 D X |
| 3,770,082 | 11/1973 | Brooks et al. | 188/71.9 |
| 3,835,961 | 9/1974 | Troester et al. | 188/71.9 |
| 4,294,335 | 10/1981 | Maehara | 188/71.9 |
| 4,306,635 | 12/1981 | Mitchell | 188/72.4 |
| 4,660,684 | 4/1987 | Carre et al. | 188/71.9 |

FOREIGN PATENT DOCUMENTS

| 3643524 | 6/1988 | Fed. Rep. of Germany ... 188/196 D |
|---|---|---|
| 1312596 | 4/1971 | United Kingdom . |
| 1232259 | 6/1971 | United Kingdom . |
| 1240222 | 7/1971 | United Kingdom . |
| 1443013 | 7/1976 | United Kingdom . |
| 2177467 | 1/1987 | United Kingdom . |
| 2210943 | 6/1989 | United Kingdom . |

*Primary Examiner*—George E. A. Halvosa
*Attorney, Agent, or Firm*—Ernest E. Helms

[57] ABSTRACT

A disc brake caliper assembly for a rotary disc brake of a vehicle which has a wear adjustment mechanism is provided. The disc brake caliper assembly (10) includes a caliper housing (14) with a piston (28) slidably mounted therein, but prevented from rotating by a lug (30) on a brake shoe (16) secured thereto which keys in a groove (32) in the piston. An actuator screw (44) and actuator nut (66) are positioned in an internal bore (65) in the piston for mechanical actuation of the brakes. If the brake pads (20,22) wear, on hydraulic actuation of the brakes, a thrust washer (70) engages and moves the actuator nut axially along the actuator screw to a new position which restricts reverse movement of the piston to a new (wear adjusted) position relative to the caliper housing. An actuator cone (68) having a friction clutch surface biased into engagement with a friction clutch surface on the piston prevents reverse movement of the actuator nut.

14 Claims, 4 Drawing Sheets

DISC BRAKE CALIPER ASSEMBLY

This is a division of application Ser. No. 07/489,052 filed on Mar. 7, 1990, U.S. Pat. No. 5,086,884.

This invention relates to a disc brake caliper assembly for a rotary disc brake of a vehicle, and in particular to a disc brake caliper assembly having a wear adjustment mechanism.

A disc brake caliper assembly having a wear adjustment mechanism is known from GB Patent No. 1,297,495.

It is an object of the present invention to provide an improvement to the above mentioned known arrangements.

To this end, one embodiment of a disc brake caliper assembly in accordance with the present invention comprises first and second brake shoes having integral brake pads of friction lining material for frictionally engaging opposite sides of the rotary disc brake, the first brake shoe having a lug projecting therefrom on the opposite side to the brake pad; a caliper housing having a cavity therein defining an expansion chamber for hydraulic fluid; an inlet port opening into the expansion chamber for passage of the hydraulic fluid; a piston sealingly slidably mounted in the cavity in the caliper housing and projecting from one end of the cavity, the first brake shoe being secured to the piston at one end thereof outside the cavity with the lug on the first brake shoe projecting into a corresponding groove in the piston to key the first brake shoe and the piston together to prevent the piston rotating relative to the caliper housing, the piston having an internal bore having a longitudinal axis and having an open end opening into the expansion chamber; a thrust washer secured in the internal bore of the piston; an actuator nut positioned in the internal bore with a functional gap between an edge portion of the actuator nut and the thrust washer, the actuator nut having a longitudinal axis; an actuator screw mounted in the cavity in the caliper housing and projecting from the other end of the cavity, the actuator screw having a longitudinal axis, the longitudinal axes of the actuator screw, the actuator nut, and the internal bore being aligned, the actuator screw extending into the internal bore and threadingly engaging the actuator nut; and actuator means positioned in the internal bore of the piston and engaging the actuator nut, the actuator means having a friction clutch surface normally resiliently biased by resilient means into engagement with a corresponding friction clutch surface in the internal bore of the piston and directed towards the open end thereof, being rotatable relative to the piston on disengagement of the friction clutch surfaces, and being rotatably fixed relative to the actuator nut but axially movable relative thereto; hydraulic actuation of the disc brake caliper assembly being actuated by pressurizing the hydraulic fluid in the expansion chamber to move the piston relative to the caliper housing in an axial direction such that the brake pads frictionally engage the rotary disc brake and such that the friction clutch surfaces become disengaged, the distance moved by the piston being greater than the functional gap between the actuator nut and the thrust washer if wear of the brake pads has occurred such that the thrust washer engages the actuator nut to rotate the actuator nut and the actuator means about the actuator screw relative to the caliper housing and to move the actuator nut relative to the caliper housing in the same axial direction as the piston, reverse rotation of the actuator nut and the actuator means being prevented by the reengagement of the friction clutch surfaces on release of the hydraulic fluid pressure thereby restricting reverse axial movement of the piston to a wear adjusted position relative to the caliper housing.

Preferably, the actuator means comprises an actuator cone in which the friction clutch surface thereon is around the circumference of one end thereof and at an angle to the longitudinal axis of the piston, and the friction clutch surface in the internal bore of the piston is at a corresponding angle. In this case, the angle of the friction clutch surfaces is approximately 45 degrees plus or minus 15 degrees.

The resilient means can comprise an elastic washer.

Preferably, a bearing means is positioned between the resilient means and the actuator means to permit rotation of the actuator means relative to the piston on disengagement of the friction clutch surfaces. In this case, the thrust washer is preferably positioned between the bearing means and the actuator means and acts on the actuator means. The bearing means preferably comprises a ball bearing housing with a plurality of ball bearings housed therein.

The actuator nut preferably has an external portion having a shaped cross-section and the actuator means has an internal portion having a correspondingly shaped cross-section, such that the external portion fits inside the internal portion to prevent the actuator nut rotating relative to the actuator means. In this case, the shaped external and internal portions are preferably hexagonal in cross-section. The edge portion of the actuator nut engageable by the thrust washer is preferably defined by the external portion thereof.

Preferably, the actuator screw has an associated mechanism for mechanical actuation of the disc brake caliper assembly.

The present invention will now be described, by way of example, with reference to the accompanying drawings, in which.

Figure 1:
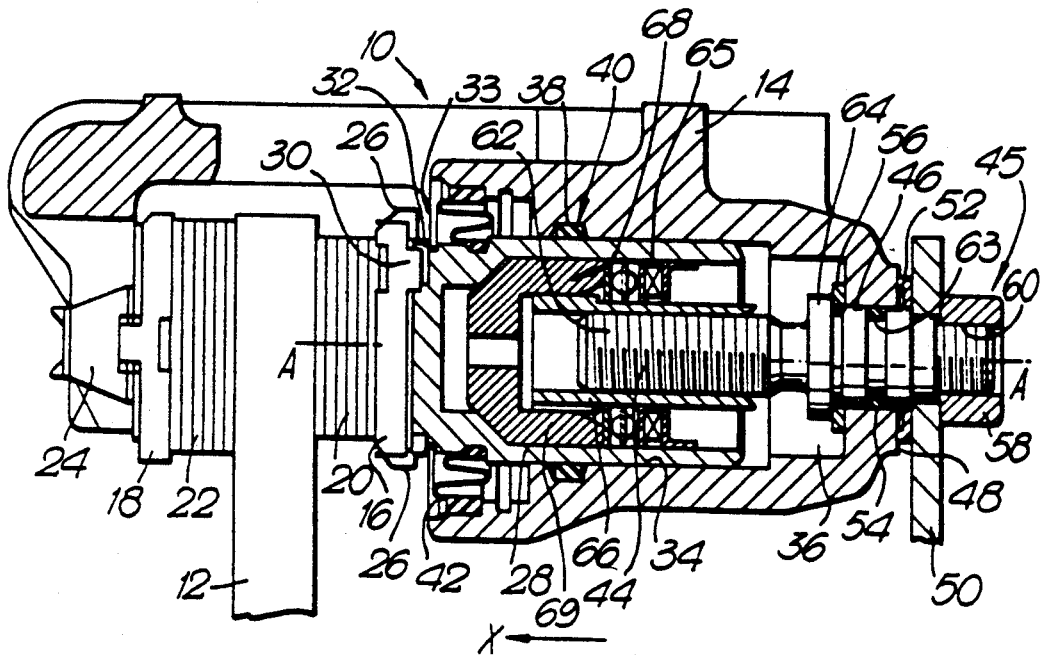
FIG. 1 is a cross-sectional view of a first embodiment of disc brake caliper assembly in accordance with the present invention.

Referring to FIG. 1 of the drawings, a disc brake caliper assembly 10 in accordance with a first embodiment of the present invention is shown in position about a portion of a rotary disc brake 12. The disc brake caliper assembly 10 comprises a caliper housing 14 and inboard and outboard brake shoes 16,18 respectively. Each brake shoe 16,18 has a brake pad 20,22 respectively of friction lining material for frictionally engaging the rotary disc brake 12. A retainer spring 24 secures the outboard brake shoe 18 to the caliper housing 14.

The inboard brake shoe 16 is secured by a resilient clip 26 to a piston 28. The arrangement of the resilient clip 26 and the piston 28 is shown more clearly in FIGS. 3, 6, 7 and 8. The resilient clip 26 has four inwardly projecting legs 118 and four outwardly projecting legs 120 (which are substantially U-shaped). The resilient clip 26 is secured to the piston 28 by passing the inwardly projecting legs 118 through corresponding grooves 32 in one end 29 of the piston, and then rotating the resilient clip relative to the piston such that the inwardly projecting legs engage a lip 122 defined by an annular groove 124 in the piston adjacent the said one end 29. The outwardly projecting legs 120 engage and secure the inboard brake shoe 16 to the piston 28. The inboard brake shoe 16 also has a lug 30 which fits into one of the grooves 32 in the piston 28 to which provides the means to key the inboard brake shoe and the piston together to prevent them rotating relative to one another.

The piston 28 is slidably mounted in, and projects from one end 33 of, a cavity 34 in the caliper housing 14. The piston 28 and the caliper housing 14 define an expansion chamber 36 in the cavity 34. An inlet port (not shown) provides an inlet for hydraulic fluid to the expansion chamber 36. A piston seal 38 is positioned in a groove 40 in the walls of the cavity 34 to provide a seal with the piston 28 to substantially prevent leakage of hydraulic fluid from the expansion chamber 36 around the piston. A flexible boot 42 engages the piston 28 and the walls of the cavity 34 adjacent the end 33 of the cavity from which the piston projects. The flexible boot 42 substantially prevents dirt and moisture entering the cavity 34, thereby substantially preventing damage to the piston seal 38 or to the walls of the cavity and/or the piston 28. Sealingly mounted in the caliper housing 14 is an actuator screw 44, which is secured to associated mechanism 45 (see FIG. 4), and which passes through an opening 46 at the opposite end 48 of the cavity 34. The associated mechanism 45 comprises a parking brake lever 50, a lever seal 52 (which is a moulded rubber seal with a resilient metallic insert), a screw seal 54, a thrust washer 56, and a jam nut 58. The actuator screw 44 has a shank which has a short external threaded portion 60 adjacent one end, a long external threaded portion 62 adjacent the other end, and an intermediate stepped portion 64. The actuator screw 44 and associated mechanism 45 are assembled as shown with the jam nut 58 threaded to the short external threaded portion 60 of the shank of the actuator screw. A portion of the intermediate stepped portion 64 is rotatably mounted in the opening 46. The screw seal 54 is positioned in a groove 63 in the intermediate stepped portion 64 and engages the wall of the opening 46 to substantially prevent leakage of hydraulic fluid from the expansion chamber 36 around the intermediate stepped portion 64 of the actuator screw 44. The thrust washer 56, lever seal 52 and jam nut 58 secure the actuator screw 44 in position, but allow rotation thereof about its longitudinal axis A relative to the caliper housing 14. The parking brake lever 50 is attached to the intermediate stepped portion 64 of the actuator screw 44 in such a way that the parking brake lever and the actuator screw rotate together about the axis A. The long external threaded portion 62 of the actuator screw 44 projects into an internal bore 65 having an open end 67 (FIG. 3) formed in the piston 28 at the opposite end to the said one end 29.

An actuator nut 66 threadingly engages (by threads 61) the long external threaded portion 62 of the actuator screw 44 within the internal bore 65 of the piston 28. The actuator nut 66 has a first small diameter portion and a second large diameter portion with a circumferential edge therebetween. The actuator nut 66, actuator screw 44, and internal bore 65 all have the same longitudinal axis A. In the embodiment of FIG. 1, and as shown in more detail in FIG. 3, the actuator nut 66 is attached to the piston 28 by actuator means 68.

Figure 3:
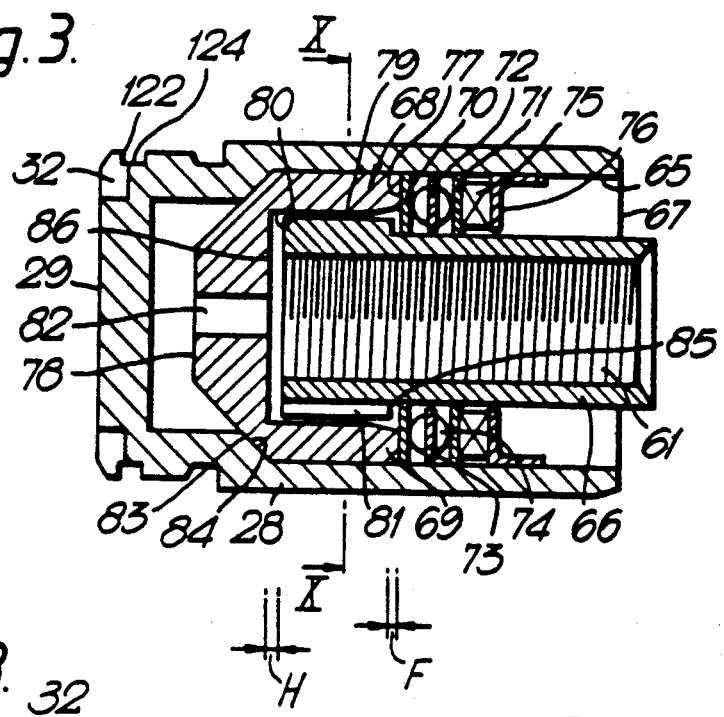
FIG. 3 is a cross-sectional view of the piston, actuator nut, and actuator cone assembly of the disc brake caliper assembly shown in FIG. 1.
Figure 8:
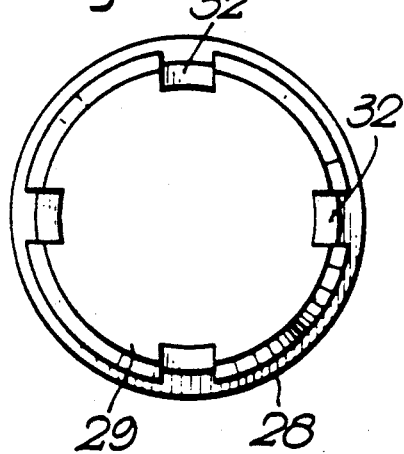
FIG. 8 is an end view of the pistons shown in FIG. 3.
Figure 10:
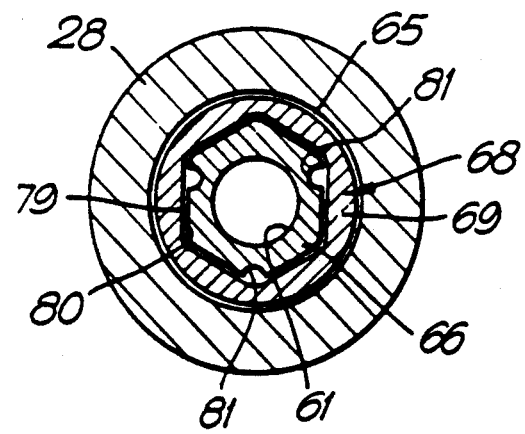
FIG. 10 is a cross-sectional view on the line X—X of FIG. 3.
Figure 4:
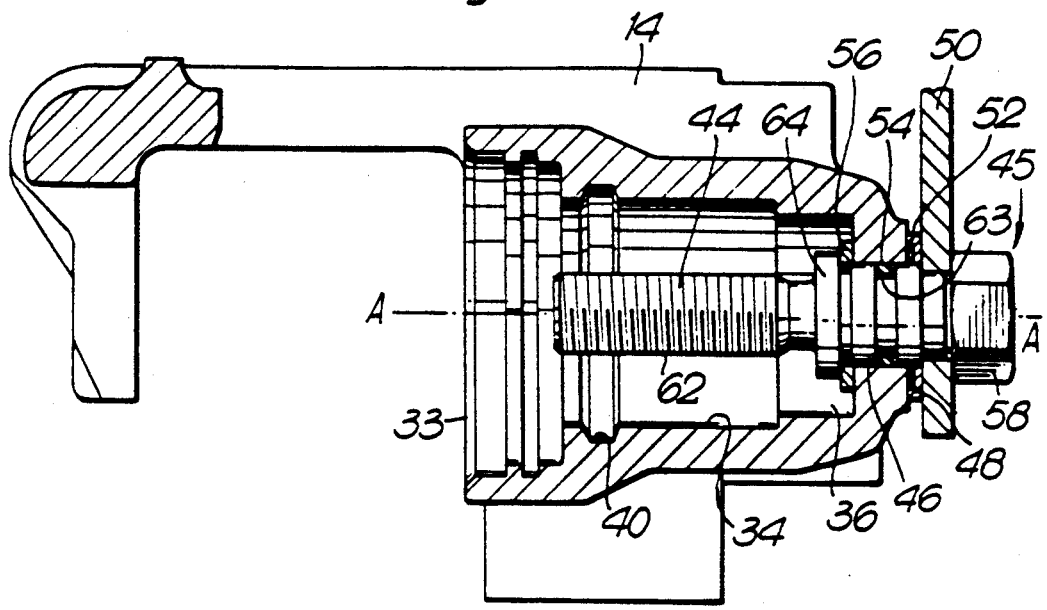
FIG. 4 is a cross-sectional view of the caliper housing and the actuator screw and associated mechanism of the disc brake caliper assembly shown in FIG. 1.

The actuator means 68 comprises an actuator cone 69; thrust washers 70,71; bearing means 72 comprising a ball bearing housing 73 and a plurality of ball bearings 74; an elastic washer (resilient means) 75; and a retainer 76 which is ring-shaped. As seen in FIG. 3, the retainer 76 is positioned in, and secured to, the internal bore 65 of the piston 28 adjacent the open end 67 of the piston. The elastic washer 75 is positioned between, and engages, the retainer 76 and one of the thrust washers 71. The bearing means 72 is positioned between, and engages, the thrust washers 70,71. The other thrust washer 70 engages one end 77 of the actuator cone 69. The other end 78 of the actuator cone 69 is directed towards the one (or closed) end 29 of the piston 28. An external portion 79 of the actuator nut 66 has a hexagonal cross-section (FIG. 10) which corresponds to an internal portion 80 of the actuator cone 69 having a similar cross-section. This arrangement is such that relative rotation about axis A between the actuator nut 66 and the actuator cone 69 is substantially prevented.

The external portion 79 of the actuator nut 66 has a number of longitudinally extending grooves 81 in its outer surface, and actuator cone 69 has a through aperture 82. The grooves 81 and the aperture 82 ensure hydraulic fluid completely fills the expansion chamber 36.

A circumferentially extending portion of the other end 78 of the actuator cone 69 defines a friction clutch surface 83 which frictionally engages a corresponding surface 84 on the internal bore 65 of the piston 28. In this particular embodiment, the friction clutch surfaces 83,84 are at approximately 45 degrees to the axis A, although any suitable angle may be used.

Figure 9:
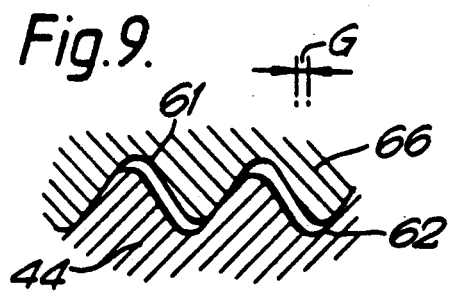
FIG. 9 is a cross-sectional view of the threads of the actuator nut and actuator screw of the disc brake caliper assemblies shown in FIGS. 1 and 2.

When the brake is not in use, the elastic washer 75 acts through the thrust washers 70,71 and the bearing means 72 on the actuator cone 69 to retain the friction clutch surfaces 83,84 in engagement. Also, the actuator nut 66 is retained within the internal bore 65 such that when the brakes are not applied, a functional gap F exists between an edge portion 85 of the external portion 79 of the actuator nut and the thrust washer 70, and a functional gap H exists between the actuator nut and an abutment surface 86 on the actuator cone 69 as shown in FIG. 3. Similarly, a functional gap G exists between the threads 61 of the actuator nut 66, and the threads of the longitudinally extending portion 62 of the actuator screw 44 as shown in FIG. 9.

The hydraulic and mechanical actuation of the disc brake caliper assembly 10 of FIG. 1 will now be described in more detail.

Hydraulic actuation is achieved by the vehicle operator applying the brakes in the usual way, for example, by depression of the vehicle brake pedal (not shown).

Hydraulic fluid passes through the inlet port (not shown) into the expansion chamber 36. The build up of pressure in the expansion chamber 36 forces the piston 28 to move in the axial direction X relative to the caliper housing 14. This movement of the piston 28 moves the brake pad 20 on the inboard brake shoe 16 into frictional engagement with the rotary disc brake 12, and by a reaction force through the caliper housing 14 similarly moves the brake pad 22 of the outboard brake shoe 18 into frictional engagement with the rotary disc brake. As soon as the piston 28 moves, the elastic washer 75 is compressed and the friction clutch surfaces 83, 84 become disengaged. The actuator cone 69 is equally hydraulically pressed on all its surfaces. When the vehicle operator releases the brakes, the pressure in the expansion chamber 36 is released and the elastic reaction force of the piston seal 38 moves the piston 28 back in the opposite direction to X.

If wear of the brake pads 20,22 does not occur, the piston 28 moves in the axial direction X a distance which is less than or equal to the sum of the functional gaps F and G, and the thrust washer 70 does not engage and move the actuator nut 66. That is, the position of the actuator nut 66 relative to the caliper housing 14 does not change during hydraulic application of the brakes. If wear does occur, the piston 28, moves a distance which is greater than the sum of the functional gaps F and G, causing the thrust washer 70 to engage the edge portion 85 of the actuator nut 66, which causes the actuator nut to rotate about the actuator screw 44 and also move in the axial direction X relative to the caliper housing 14.

With the friction clutch surfaces 83,84 out of engagement, the actuator cone 69 is also free to rotate about the actuator screw 44 relative to the piston 28. Such rotation is caused by the rotation of the actuator nut 66 due to the hexagonal cross-sections of the external and internal portions 79,80 respectively of the actuator nut 66 and the actuator cone 69 respectively, and is permitted due to the presence of the bearing means 72. When the hydraulic pressure is released, the friction clutch surfaces 83,84 are or become reengaged due to the action of the elastic washer 75 on the actuator cone 69, thereby preventing reverse rotation of the actuator cone 69 and the actuator nut 66 relative to the actuator screw 44, and thereby preventing movement of the actuator nut in a direction opposite to X. Because the piston 28 is keyed to the inboard brake shoe 16 by the lug 30 and groove 32 arrangement, the piston is prevented from rotating about the actuator screw 44, and as a consequence, the piston can only move in the direction opposite to X (assisted by the elastic reaction force of the piston seal 38) by a distance which is sufficient to restore the functional gaps F and G between the actuator nut 66 and the thrust washer 70, and the screw threads 61,62, that is, the piston moves back to a new (wear adjusted) position relative to the caliper housing. This arrangement therefore provides automatic adjustment for wear each time the brakes are hydraulically applied.

The disc brake caliper assembly 10 is actuated mechanically by the vehicle operator in the usual way, for example, by actuation of the hand brake lever (not shown). Such actuation results in a force being applied to the parking brake lever 50, causing the parking brake lever and the actuator screw 44 to rotate about the axis A relative to the caliper housing 14. The force exerted by the elastic washer 75 on the actuator cone 69 keeps the friction clutch surfaces 83,84 in engagement. This prevents rotation of the actuator cone 69, and hence the actuator nut 66, about the axis A in the same direction as the actuator screw 44, and the lug 30 and groove 32 arrangement prevents the piston 28 rotating with the actuator screw 44. As a consequence the actuator nut 66 moves in the axial direction X relative to the caliper housing 14 to close the functional gap H, engage the abutment surface 86, and move the piston 28 in the axial direction X. Such movement of the piston 28 moves the brake pad 20 of inboard brake shoe 16 into frictional engagement with the rotary disc brake 12, and, by a reaction force through the caliper housing 14, similarly moves the brake pad 22 of the outboard brake shoe 18 into frictional engagement with the rotary disc brake.

Release of the mechanical actuation reverses the direction of rotation of the parking brake lever 50 and actuator screw 44 about the axis A relative to the caliper housing 14. This causes the actuator nut 66 and the actuator cone 69 (and the piston 28) to move axially in a direction opposite to X relative to the caliper housing 14 because the engagement of the friction clutch surfaces 83, 84 prevents the actuator nut and the actuator cone rotating relative to the actuator screw 44 during this reverse axial movement. The elastic reaction force of the piston seal 38 also assists in moving the piston 28 back to its original position. In normal conditions (which include a range of pressure actuations), no wear adjustment occurs during mechanical actuation.

Figure 2:
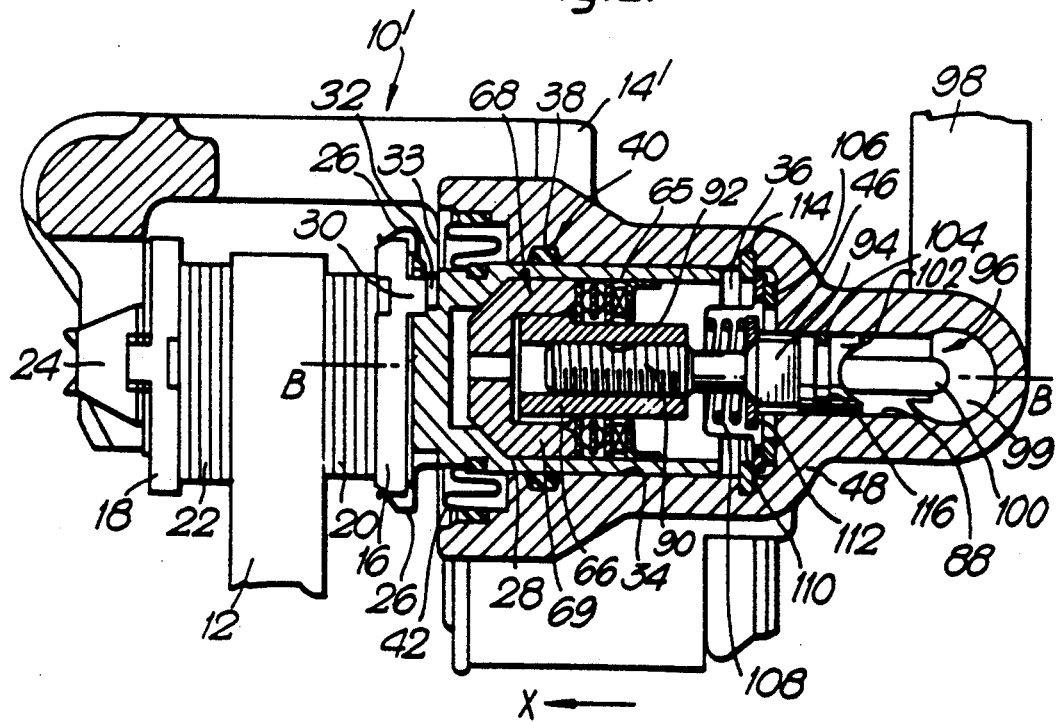
FIG. 2 is a cross-sectional view of a second embodiment of disc brake caliper assembly in accordance with the present invention.
Figure 5:
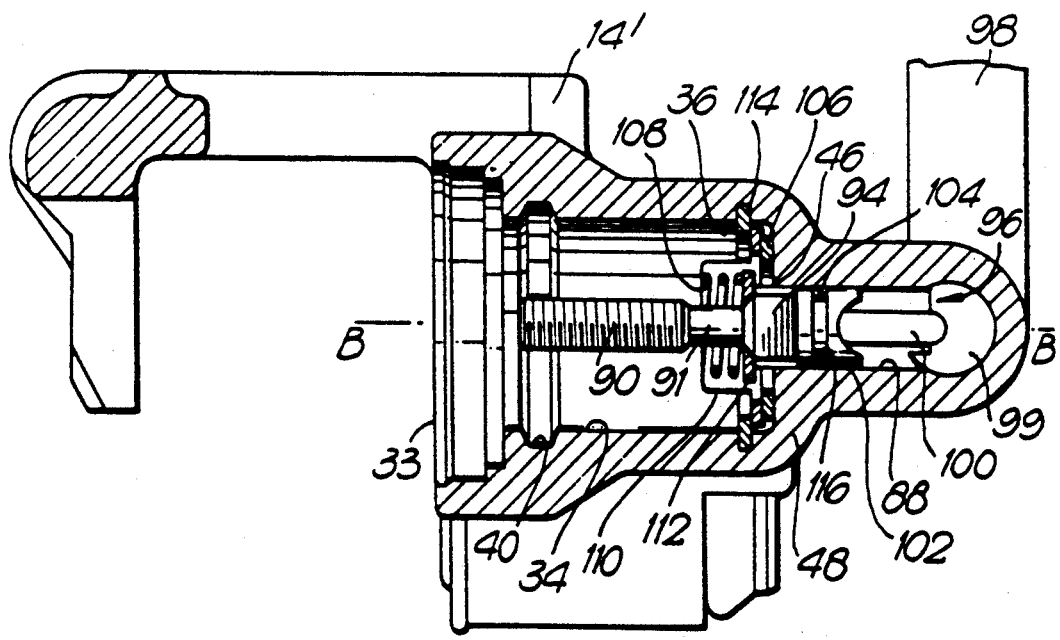
FIG. 5 is a cross-sectional view of the caliper housing and the actuator screw and associated mechanism of the disc brake caliper assembly shown in FIG. 2.
Figure 6:
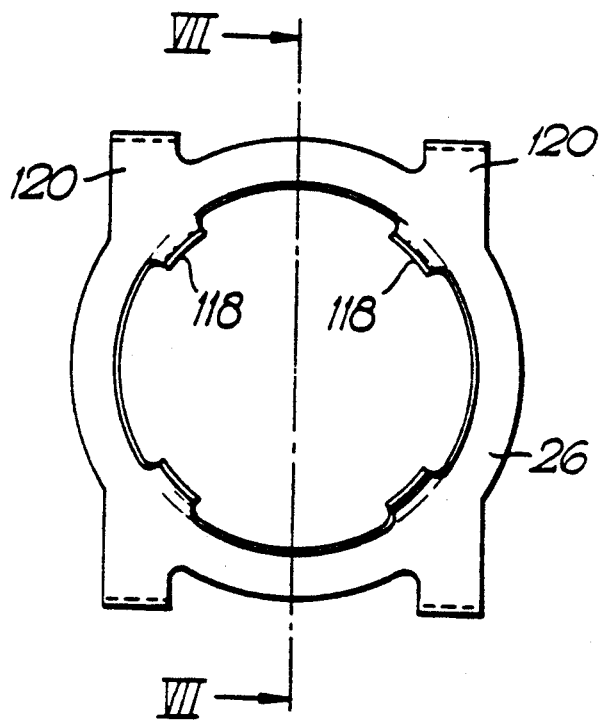
FIGS. 6 and 7 are end and cross-sectional views respectively of the resilient clips shown in FIGS. 1 and 2.
Figure 7:
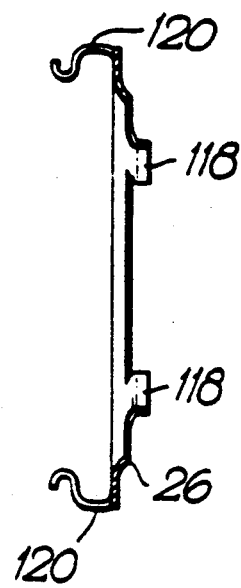

A second embodiment of disc brake caliper assembly 10' in accordance with the present invention is shown in FIG. 2. This second embodiment is similar to the first embodiment shown in FIG. 1, and similar parts have been given the same reference number. The main difference between the second embodiment and the first embodiment is the actuator screw, its associated mechanism, and its mode of operation. The caliper housing 14' of this second embodiment has been modified to accommodate the above mentioned differences. The caliper housing 14' includes a channel section 88 extending from the opening 46 at its opposite end 48. The actuator screw 90 in FIG. 2 comprises a shank 91 having an external threaded portion 92 and a head 94. The external threaded portion 92 threadingly engages the threads 61 of the actuator nut 66. The associated mechanism 96 (see FIG. 5) comprises a parking brake lever 98, an eccentric shaft 99, a pushrod 100, a piston member 102, a seal 104, a washer 106, a spring 108, a spring retainer 110, a thrust washer 112 and a retainer stop 114. The piston member 102 is a sliding fit in the channel section 88 of the caliper housing 14' and has a groove 116 therein in which the seal 104 is positioned to substantially prevent leakage of hydraulic fluid from the expansion chamber 36 around the piston member. The piston member 102 is secured at one end to the head 94 of the actuator screw 90, and engages the pushrod 100 at its other end. The pushrod 100 also engages the eccentric shaft 99, which is connected to the parking brake lever 98. This arrangement is such that if the 30 parking brake lever 98 is rotated about the longitudinal axis B of the actuator screw 90, the eccentric shaft 99 is also rotated causing the pushrod 100, the piston member 102 and the actuator screw 90 to move in an axial direction (parallel to the axial direction X) along the axis B. This arrangement differs from that in the first embodiment of FIG. 1, where rotation of the parking brake lever 50 causes rotation of the actuator screw 44 about its longitudinal axis A. In this second embodiment, rotation of the parking brake lever 98 causes axial movement of the actuator screw 90 along its longitudinal axis B relative to the caliper housing 14'. The spring 108 and its spring retainer 110 and thrust washer 112 are positioned on the opposite side of the head 94 of the actuator screw 90 to the piston member 102 within the expansion chamber 36.

The hydraulic and mechanical actuation of this second embodiment of disc brake caliper assembly 10' will now be described.

The hydraulic actuation of the second embodiment of FIG. 2 is the same as that of the first embodiment of FIG. 1.

The disc brake caliper assembly 10' is operated mechanically in the usual way by the vehicle operator, for example, by actuation of the hand brake lever (not shown). Such actuation results in a force being applied to the parking brake lever 98 which rotates the parking brake lever and the eccentric shaft 99 about the axis B relative to the caliper housing 14'. Rotation of the eccentric shaft 99 causes the pushrod 100, the piston member 102 and the actuator screw 90 to move in the axial direction X relative to the caliper housing 14'. As the head 94 of the actuator screw 90 engages the thrust washer 112, the thrust washer 112 is also moved in the axial direction X relative to the caliper housing 14' A flat(s) (not shown) on the interior of washer 106 abuts a flat(s) (not shown) of the head 94 to prevent rotation the actuator screw 90. As the spring retainer 110 engages the retainer stop 114, the spring 108 is compressed due to the relative movement of the thrust washer 112. The force exerted by the elastic washer 75 on the actuator cone 69 keeps the friction clutch surfaces 83,84 in engagement. This prevents rotation of the actuator cone 69, and hence the actuator nut 66, about the axis B in the same direction as the actuator screw 90, and the lug 30 and groove 32 arrangement prevents the piston 28 from rotating relative to the caliper housing 14'. As a consequence, the axial movement of the actuator screw 90 causes the actuator nut 66 to move in the axial direction X relative to the caliper housing 14' to close the functional gap H. The actuator nut 66 then engages the abutment surface 86 of the actuator cone 69 to move the piston in the axial direction X relative to the caliper housing 14'. Such movement of the piston 28 moves the brake pad 20 of inboard brake shoe 16 into frictional engagement with the rotary disc brake 12, and, by a reaction force through the caliper housing 14', similarly moves the brake pad 22 of the outboard brake shoe 18 into frictional engagement with the rotary disc brake.

Release of the mechanical actuation reverses the direction of rotation of the parking brake lever 98 and eccentric shaft 99 about the axis B relative to the caliper housing 14'. This allows the pushrod 100, the piston member 102, and the actuator screw 90 to move axially in the reverse direction to X relative to the caliper housing 14' under the action of the spring 108. The engagement of the friction clutch surfaces 83, 84 prevents the actuator nut 66 and actuator cone 69 rotating relative to the actuator screw 90 during this reverse axial movement. The actuator nut 66, actuator cone 69 and the piston 28 therefore also move axially in a reverse direction to X relative to the caliper housing 14'. The elastic reaction force of the piston seal 38 also assists in moving the piston 28 back to its original position, and no wear adjustment occurs.

Figure 11:
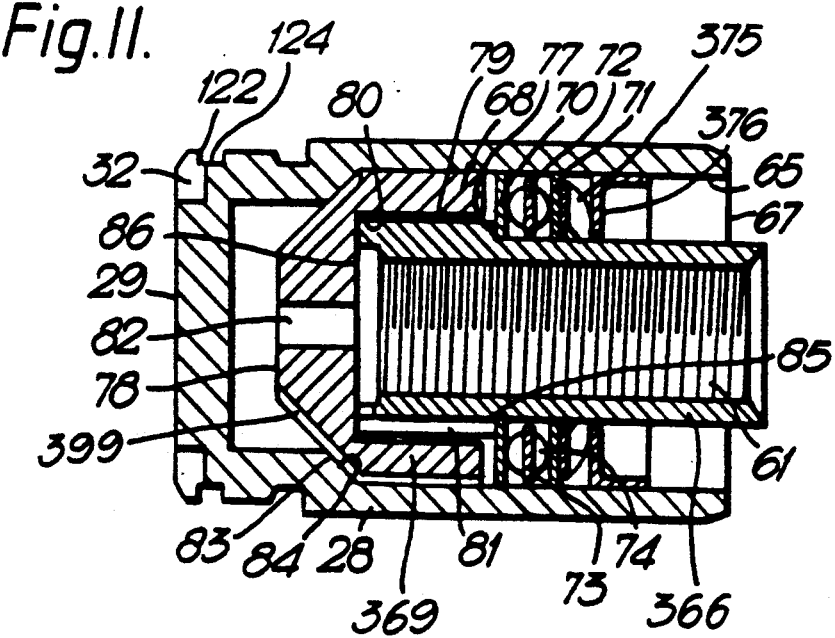
FIG. 11 is a view similar to FIG. 3 of a third embodiment of the present invention.

In FIG. 11 a third embodiment of the present invention has the thrust washer 70 directly load the actuator 366. Therefore, the prior gapping F is eliminated and actuator cone 369 is continually urged towards the inboard shoe 16 by contact with the actuator nut 66. With the above arrangement the functional gap is equal the gap G and adjustment will occur whenever wear on the shoe linings exceed the gap G.

A particular advantage provided by the embodiment of FIG. 11 is that the angular rotation of the parking brake lever 50 required for mechanical actuation is lowered as compared with the embodiment of FIG. 1 because of the elimination of gaps F and H. Additionally, the embodiment of FIG. 11 utilizes a metallic spring wave-type washer 375 as a resilient means, located by a cone type retainer 376. The actuator cone 369 has a series of slots 399 to allow free flow of hydraulic fluid in front of the cone 369.

An advantage of the present invention is that on a hydraulic apply the hydraulic line pressure creates a force that causes the piston 28 to load the inboard shoe 16 and the housing 14 to load the outboard shoe 18. As the piston moves out against the shoe the actuator cone 69,369 is unloaded from the piston 28,29. The only load on the actuator cone 69,369 is the low force from the resilient means. As the piston 28,29 and actuator cone 69,369 separate the spring load builds up on the actuator cone 69,369 to follow, the piston 28. Upon release, the piston 28,29 retracts due to two forces, the caliper housing 14 and shoe and lining deflection forces and the piston seal 38 retraction force. The piston retraction is limited by the functional gap and the load - travel relationship of the resilient means.

The piston 28,29 is adjusted on apply and the piston retraction is controlled by the retraction forces functional gap and by the load travel relationship of the resilient means. The above, therefore, allows for optimization of the opposing desires of low mechanical travel and low residual load by varying the parameters of functional gap and or load travel relationship of the compliance means.

On a mechanical apply the input torque and rotation of the screw (or axial movement) creates a force that causes the piston 28,29 to load the inboard shoe 16 and the housing 14 to load the outboard shoe 18. The actuator screw thread drives the actuator nut which drives the piston 28 through the actuator cone 69,369.

Upon a mechanical release the piston 28,29 is retracted not only by the seal 38 retraction forces but also caliper 10 deflection forces. The opposing force is the resilient means and the thread friction. Until these forces are balanced the piston 28,29 will still retract as the actuator nut 66,366 moves axially back as the actuator screw 44 is rotated back. The nut 66,366 does not rotate due to the loading of the cone 69,369 and piston 28,29 by the caliper deflection forces. The aforementioned allows optimization of the opposing desires of low mechanical travel and low residual load by varying the parameters of the resilient means controlling the load, rate, and deflection.

Various alterations could be made to the above described arrangements without departing from the scope of the present invention. For example, the external and internals portions 79,80 respectively could have a shape other than hexagonal, but be of such a shape as to prevent relative rotation of the actuator nut 66 relative to the actuator cone 69. Further, the actuator nut 66 has been shown as a male component, and the actuator cone 69 as a female component; but the opposite arrangement will equally work. Further still, the actuator cone 69 could be replaced by cylindrical sleeve, one end of which defines a friction clutch surface which engages a friction clutch surface on the piston 28,29 which is substantially normal to the axis A. Further still, the elastic washer could be replaced by a spring or any other suitable form of resilient means. Any suitable form of bearing means may be used other than ball bearings.

Although the present invention has been described in relation to floating disc brake caliper assemblies, it could equally apply to any form of disc brake caliper assembly. Similarly, although the present invention has been described in relation to disc brake caliper assemblies having a parking (mechanically operated) brake, it could equally apply to disc brake caliper assemblies without a parking brake as long as an actuator screw is present within the internal bore of the piston.

The present invention has the advantages of providing wear adjustment during hydraulic actuation of the brake which substantially corresponds to the wear on the brake pads, and of providing a relatively cheap and simple arrangement for providing such wear adjustment.

We claim:

1. A disc brake caliper assembly for a rotary disc brake of a vehicle comprising first and second brake shoes having integral brake pads of friction lining material for frictionally engaging opposite sides of the rotary disc brake; a caliper housing having a cavity therein defining an expansion chamber for hydraulic fluid; an inlet port opening into the expansion chamber for passage of the hydraulic fluid; a piston sealingly slidably mounted in the cavity in the caliper housing and projecting from one end of the cavity, the piston being completely filled from the inlet port, the first brake shoe being secured to the piston at one end thereof outside the cavity with means to key the first brake shoe and the piston together to prevent the piston rotating relative to the caliper housing, the piston having an internal bore having a longitudinal axis and having an open end opening into the expansion chamber; an actuator means thrust washer secured in the internal bore of the piston; an actuator nut positioned in the internal bore having a longitudinal axis and a first smaller diameter and a second larger diameter with a circumferential edge therebetween; and an actuator screw mounted in the cavity in the caliper housing and projecting from the other end of the cavity, the actuator screw having a longitudinal axis, the longitudinal axes of the actuator screw, the actuator nut, and the internal bore being aligned, the actuator screw extending into the internal bore and threadingly engaging the actuator nut, with a functional gap between the threads of the actuator nut and actuator screw; and actuator means positioned in the internal bore of the piston and engaging the actuator nut circumferential edge, the actuator means having a friction clutch surface normally resiliently biased via resilient means which urges the actuator means thrust washer into engagement with the actuator nut causing the actuator nut to bias the actuator means into engagement with a corresponding friction clutch surface in the internal bore of the piston and directed towards the open end thereof, the actuator means being rotatable relative to the piston on disengagement of the friction clutch surfaces, and being rotatably fixed relative to the actuator nut but axially movable relative thereto; hydraulic actuation of the disc brake caliper assembly being actuated by pressurizing the hydraulic fluid in the expansion chamber to move the piston relative to the caliper housing in an axial direction such that the brake pads frictionally engage the rotary disc brake and such that the friction clutch surfaces become disengaged, the distance moved by the piston being greater than the functional gap between the actuator nut threads and the actuator screw threads if wear of the brake pads has occurred such that the actuator means thrust washer engages the actuator nut to rotate the actuator nut and the actuator means about the actuator screw relative to the caliper housing and to move the actuator nut relative to the caliper housing in the same axial direction as the piston; reverse rotation of the actuator nut and the actuator means being prevented by reengagement of the friction clutch surfaces on release of the hydraulic fluid pressure thereby restricting reverse axial movement of the piston to a wear adjusted position relative to the caliper housing.

2. A disc brake caliper assembly as claimed in claim 1, wherein the actuator means comprises an actuator cone in which the friction clutch surface thereon is around the circumference of one end thereof and at an angle to the longitudinal axis of the piston, and the friction clutch surface in the internal bore of the piston is at a corresponding angle.

3. A disc brake caliper assembly as claimed in claim 1, wherein the angle of the friction clutch surfaces is approximately 45 degrees.

4. A disc brake caliper assembly as claimed in claim 1, wherein the resilient means comprises an elastic washer.

5. A disc brake caliper assembly as claimed in claim 1, wherein the resilient means comprises a metallic spring washer.

6. A disc brake caliper assembly as claimed in claim 1, wherein a bearing means is positioned between the resilient means and the actuator nut to aid rotation of the actuator means relative to the piston on disengagement of the friction clutch surfaces.

7. A disc brake caliper assembly as claimed in claim 1, wherein the bearing means comprises a ball bearing housing with a plurality of ball bearings housed therein.

8. A disc brake caliper assembly as claimed in claim 1, wherein the actuator nut has an external portion having a shaped cross-section and the actuator means has an internal portion having a correspondingly shaped cross-section, such that the external portion fits inside the internal portion to prevent the actuator nut rotating relative to the actuator means.

9. A disc brake caliper assembly as claimed in claim 8, wherein the shaped external and internal portions are hexagonal in cross-section.

10. A disc brake caliper assembly as claimed in claim 9, wherein the external portion of the actuator nut defines an edge portion thereof engageable by the thrust washer.

11. A disc brake caliper assembly as claimed in claim 1, wherein the actuator screw has an associated mechanism for mechanical actuation of the disc brake caliper assembly.

12. A disc brake caliper assembly as claimed in claim 11, wherein the actuator screw is rotated by the associated mechanism to mechanically actuate the disc brake assembly.

13. A disc brake caliper assembly as claimed in claim 11, wherein the actuator screw is moved axially by the associated mechanism to mechanically actuate the disc brake assembly.

14. A disc brake caliper assembly as described in claim 1, wherein in the means to key the first brake shoe and the piston together includes the first brake shoe having a lug projecting therefrom on the opposite side to the brake pad and the lug projects into a corresponding groove in the piston.

* * * * *